United States Patent

Borello

[11] 4,020,370
[45] Apr. 26, 1977

[54] ELECTRIC MOTOR FOR GENERAL PURPOSES

[76] Inventor: Domenic Borello, 142 Nyack Ave., Pelham, N.Y. 10803

[22] Filed: Dec. 15, 1975

[21] Appl. No.: 640,974

[52] U.S. Cl. .................................. 310/37; 310/24
[51] Int. Cl.² ........................................ H02K 7/06
[58] Field of Search ............... 310/14, 15, 37, 39, 310/20, 23, 24, 29, 30, 34, 35

[56] References Cited

UNITED STATES PATENTS

| | | | |
|---|---|---|---|
| 464,063 | 12/1891 | Collom | 310/14 |
| 1,068,531 | 7/1913 | Rhodes | 310/14 |
| 1,132,445 | 3/1915 | Conrad | 310/14 |
| 1,231,193 | 6/1917 | Powers | 310/14 X |
| 1,307,210 | 6/1919 | Newcomb | 310/14 X |
| 2,109,953 | 3/1938 | Bates | 310/34 X |
| 2,174,296 | 9/1939 | Wallace | 310/15 UX |
| 2,174,296 | 9/1939 | Wallace | 310/156 X |
| 2,442,016 | 5/1948 | Poole | 310/29 UX |
| 2,741,712 | 4/1956 | Lonnquist | 310/37 |
| 3,139,546 | 6/1964 | Parr | 310/37 X |
| 3,302,045 | 1/1967 | Dotto | 310/37 |
| 3,351,789 | 11/1967 | Bertling | 310/37 |

Primary Examiner—Donovan F. Duggan
Attorney, Agent, or Firm—Bauer, Amer & King

[57] ABSTRACT

The within invention, which is directed to effective use of electric energy is concerned with an improved electric motor which, as a substitute for the conventional operative arrangement of rotor and field coils, instead has the rotor urged through movement centrally of, rather than merely past, the field coils, thus obtaining maximum prime mover drive for any electrically powered motor.

4 Claims, 9 Drawing Figures

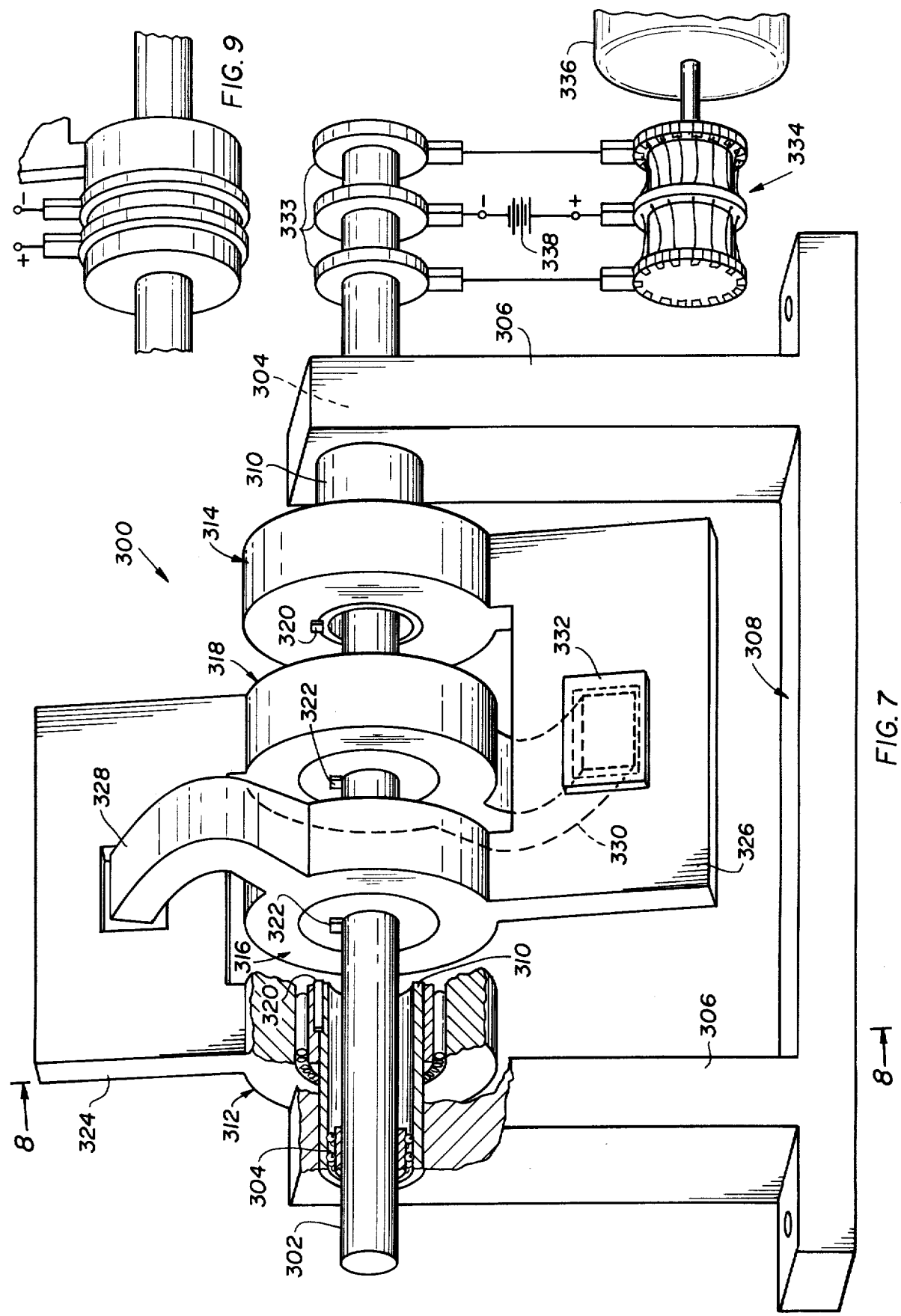

ELECTRIC MOTOR FOR GENERAL PURPOSES

The present invention relates generally to improvements for an electric motor, the improvements, more particularly, residing in a more effective electric prime mover or motor.

As generally understood, a conventional electric motor utilizes an induced magnetic field to cause driving rotation of its magnetizable rotor. Thus, in a sense, a conventional electric motor is a magnet-type device in that its motive power output is a function of the effectiveness with which the induced magnetic field pulls the rotor through the power stroke of the operating cycle of the motor. In connection with the above, underlying the present invention is the recognition that a conventional motor, because of its mode operation, is, in actual fact, a poorly functioning, and inefficient magnet. Among other shortcomings, the magnetic field and the rotor or armature of a conventional motor are operatively arranged in an offset or non-aligned relation, i.e. the field producing coils are located adjacent the rotary path of the rotor which, when magnetically attracted by said field, moves merely past, but not through the field. Heretofore, this operative arrangement of these components, achieving only an indirect, rather than a direct or aligned magnetic pulling relationship, was an acceptable alternative to reconstructing the motor to obviate this inherent shortcoming. Also, powerline or utility-supplied electricity to operate conventional electric motors has heretofore been plentiful and sufficiently economical to tolerate the ineffeciency noted. The circumstances now, however, have changed radically. The fuel supply has severely diminished and the cost has become prohibitive.

To enhance an understanding of the improved electric motor hereof, it is helpful to refer to a somewhat analogous situation. Specifically, the construction and mode of operation of a solenoid is, of course, well understood. It has particularly been recognized that the dissipation of comparatively little electrical energy, i.e. by the flowing of relatively small amperage current through the solenoid coil to generate the magnetic field thereof, a strong mechanical force or power stroke is achieved during the magnetic pull of the solenoid plunger towards the coil. In the contemplated operation of the within improved electric motor embodiment, this efficient solenoid-type relationship between the magnet components of the motor is used in place of the usual operating relationship of these components now used in conventional electric motors.

Broadly, it is an object of the present invention to provide a practical and effective electric motor overcoming the foregoing and other shortcomings of the prior art. Specifically, it is an object to provide an improved electric motor in which the field and rotor type components are in a direct solenoid-type alignment, thereby maximizing the motive drive output for the available electric energy.

A motor embodiment demonstrating objects and advantages of the present invention includes plural magnetic field generating coils, each having a central opening strategically located not merely adjacent, but directly on the contemplated rotary path of the rotor or magnetizable plunger of the motor. That is, said noted positional location of each coil as regards the generally cylindrically shaped plunger provides an operational arrangement in which each coil is in surrounding relationship to said plunger or to the contemplated rotary path of same. Further, in one specific embodiment, there are at least two plungers journalled for rotation 180 degrees apart from the power take-off shaft, and cooperating therewith are two field coils, each in a slightly advanced relation to a plunger and arranged to be rotated in said advanced positions, to thereby cause corresponding rotation of the plungers and said shaft. In this embodiment, the aligned plungers never actually project through the coils, thus enabling use of field-supplementing techniques, such as the use of an additional pole piece or so-called wafer or keeper, all as will be explained in detail subsequently.

The above brief description, as well as further objects, features, and advantages of the present invention will be more fully appreciated by reference to the following detailed description of a presently preferred, but nonetheless illustrative embodiment in accordance with the present invention, when taken in conjunction with the accompanying drawings, wherein:

FIG. 1 illustrates a coil-created magnetic field;

FIG. 2 illustrates the effect of said field of FIG. 1 on an iron bar or plunger;

FIG. 3 illustrates how the magnetic field of FIGS. 1, 2 is enhanced by an additional pole piece or so-called wafer or keeper;

FIG. 4 is a graph demonstrating the comparative magnetic forces of the fields of FIGS. 2 and 3;

FIG. 5 illustrates the plunger movement caused by said coil-created magnetic field; and FIG. 6 illustrates how said plunger movement of FIG. 5 is directed along a rotary path to, in turn, provide a rotary motor drive.

FIG. 7 is a front elevational isometric view, partly in section, of an embodiment in which use is made of a magnetic field keeper;

FIG. 9 illustrates how conventional brushes and rings may be used to supply current to the solenoid coils of this motor.

GENERAL

Figure 1:
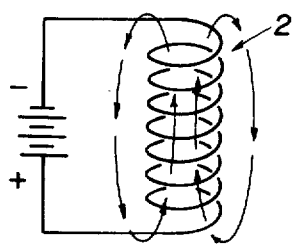
FIGS. 1–6 illustrate general principles embodied in the inventive electric motor hereof. More particularly.
Figure 2:
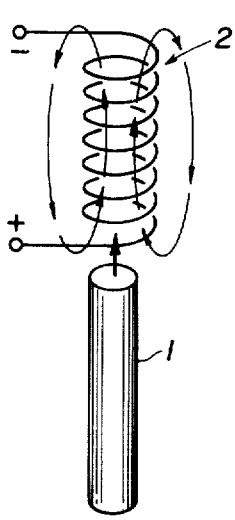

In contrast to a conventional electric motor, in the operation of which a rotor rotates in passing relation to a surrounding magnetic field-creating stator, the motor embodiment hereof utilizes rotors, or plungers, that actually move into and through, rather than merely past, the magnetic field. What, in essence, is therefore involved is the fundamental operating concept of a solenoid, in the known and well understood operation of which a DC current made to pass through a coil creates a magnetic field 2, as illustrated in FIG. 1.

Figure 3:
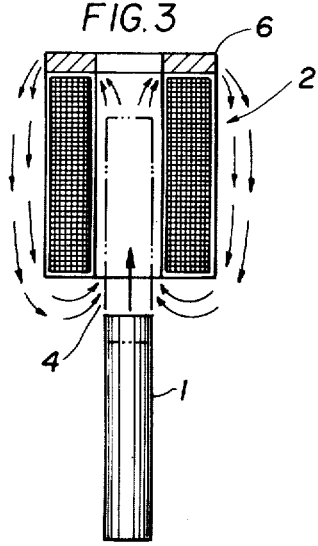
Figure 4:
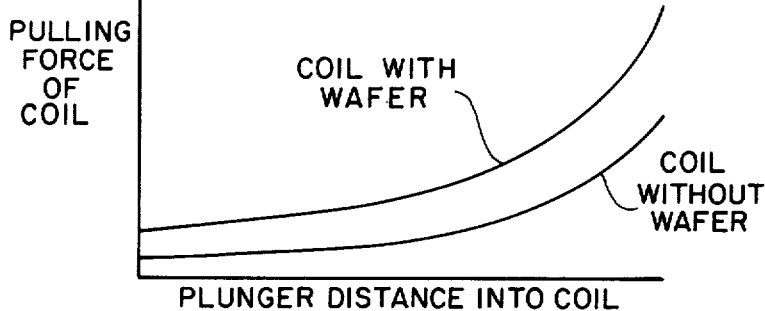

If an iron bar or plunger 1 is adjacent a magnetic field or coil 2 it will be pulled into the coil. Because of the permeability of the construction materials of the coil 2, the magnetic field concentrates therein, as at 4, and the magnetic force on the plunger increases. For a given current and coil, the magnetic pull can be further concentrated by adding an iron pole piece, wafer or keeper, designated 6 in FIG. 3, thus increasing the magnetic force on the plunger 1. The results of the above combinations are demonstrated in the graph of FIG. 4.

If the current is allowed to flow and the plunger 1 to advance, a point of equilibrium will be reached. That is, the plunger 1 will stay at an equilibrium point within the stationary coil 2. If, however, the coil 2 is advanced as fast as the plunger travels, then the plunger will continue to follow, as indicated by the movements 8, 10 in FIG. 5.

Figure 6:
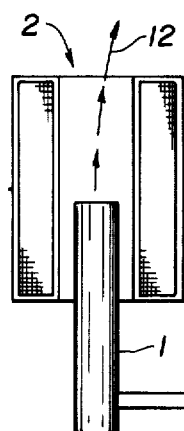

Also, as illustrated in FIG. 6, if the plunger 1 can be arranged to follow a rotary path, a rotary motor drive 14 is established.

This motor embodiment, generally designated 300, utilizes a solenoid-type relationship for its rotor and magnetic field. Motor 300 is additionally advanced in its use of this technique in that it also advantageously makes use of an enhanced or supplemented field provided by a pole piece or keeper 6, as explained in connection with FIG. 3. Strategically located adjacent the keeper may be a permanent magnet to further increase the force of the magnetic field. Since a keeper, such as keeper 6 of FIG. 3, blocks movement through the central opening of the field coil, rotary output movement of motor 300 thus requires advancing the keeper-closed coil through a rotary path in front of a following plunger, all as previously was generally explained in connection with FIG. 5.

Figure 5:
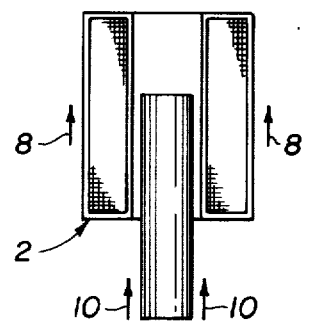
Figure 8:
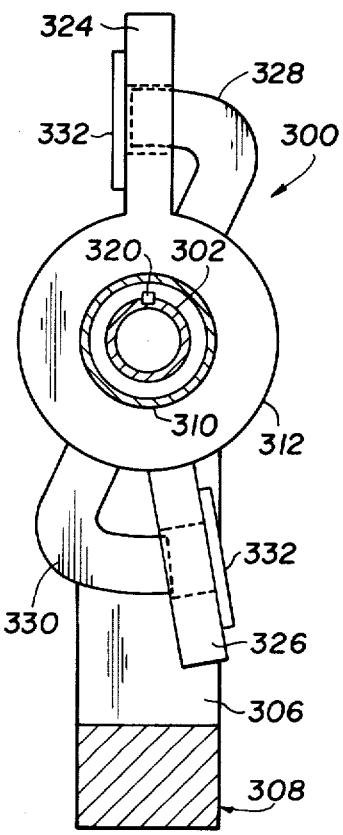
FIG. 8 is a side elevational view, in section taken along line 8—8 in FIG. 7.

To obtain the FIG. 5 movements 8 and 10 in the field and plunger, respectively, motor 300 makes novel use of cooperating overriding clutches of the roller pin type. Briefly, an overriding clutch is a device comprised of three main parts; an outer sleeve or housing; a clutching mechanism; and an inner sleeve or shaft sleeve. Although not essential, bearings of an appropriate type may be incorporated. The clutching mechanism insures that relative rotational motion may take place between the inner and outer sleeves in one direction, but not in the other direction. That is, if the shaft sleeve is held fixed, the outer sleeve may be rotated in one direction but not in the opposite direction. Counterwise, if the outer sleeve is held fixed the inner sleeve may be rotated in one direction and not in the other.

As seen in FIG. 7, a main shaft 302 is supported on opposite ends by bearings 304 fixed in support legs 306 of chassis frame 308. A sleeve 310 is anchored in each of the legs 306 (see cross-section at left of FIG. 7). Mounted about shaft 302 are two pairs of overriding clutches. Looking at FIG. 7, the left outboard clutch is 312, the right outboard clutch is 314, the left inboard clutch is 316, and the right inboard clutch is 318. Clutches 312 and 314 are each attached to housing 308 but not shaft 302, and clutches 316 and 318 are each attached to shaft 302 but not to housing 308.

The shaft sleeves of clutches 312 and 314 are locked to sleeves 310 by means of keys 320. The shaft sleeves of clutches 316 and 318 are locked to shaft 302 by means of keys 322. Mounted between, and for counterclockwise rotation as permitted by the other sleeves of clutches 312 and 318, is a member having a first electromagnetic coil 324. Similarly mounted between and for counterclockwise rotation, but to the outer sleeves of clutches 316 and 314, is a second electromagnetic coil 326. Also on the outer sleeves of the inboard clutches 316 and 318 are plunger arms 328 and 330, respectively. Keeper pieces 332 are here employed to great advantage in strengthening the magnetic pull between the cooperating coils and plungers.

Slip rings 332, with appropriate brushes, supply current to coils 324 and 326 via conductors connected to rings mounted on the outboard side of either clutch 312 or 314, as illustrated in FIG. 9, the supplied current being sequenced by rotary switch 334. Rotary switch 334 is controlled by variable speed motor 336 which, in turn, can be controlled by accelerator means not shown. Rotary switch 334 can also be controlled by a commutator fixed to shaft 302.

In operation, the energy source 338 is connected to start operation of motor 336 which correspondingly starts to turn in a selected direction and at a selected speed. To prevent sparking or burning at switch 334, current is introduced to this switch only after it starts rotating. Rotary switch 334 is then effective to supply current to coils 324 and 326 in an alternating manner, i.e. first one coil is energized and then the current is stopped, then the other coil receives current and the current is stopped, and this sequence or cycle is continuously repeated.

Due to the directional characteristic of the overriding clutches, plunger arm 328 will be pulled into coil 324 when current flows in this coil, carrying shaft 302 through a small counterclockwise angle or movement. Coil 326 will at this time also be separated from plunger arm 330 and assume a desired advanced position with respect to plunger 330. It should be noted that coil 324 does not move towards plunger arm 328 because clutch 312 locks for clockwise movement of its outer sleeve. As the plunger 328 approaches the keeper plate 332, maximum pull will be applied and current will be shut off in coil 324.

Following de-energizing of coil 324, there instantly is current supplied via switch 334 to coil 326, which then couples with plunger arm 330, just as coil 324 did with plunger 328. Plunger arm 330 thus advances a small counterclockwise angle, carrying with it shaft 302. Here again, clutch 314 has locked coil 326 from clockwise motion forcing the movement of plunger 330 to coil 326, rather than vice versa. Note that the member or support for the coil 324 is advanced relative to plunger 328 as a result of counterclockwise movement of plunger 330.

As a result of the foregoing, it should be readily appreciated that shaft 302 experiences a series of rapid torsional pulses as the above cycle is repeated under the sequencing control of switch 334. As a result, shaft 302 is effectively powered in rotation, which is the illustrated example is in a counterclockwise direction. Multiple arrays of clutches and coils acting on a common shaft result in a smooth action, particularly when a flywheel is employed on the output shaft.

With regard to powering an electric vehicle, the within motor, by virtue of utilizing a rotor which moves directly through, rather than merely past, the magnetic field, as is the case with a conventional motor, has the capability of functioning, and does function, as a more effective prime mover for an electric vehicle which must carry its own energy source in the form of batteries or the like. Stated another way, a conventional motor, operated in a conventional way by electrically supplied by utility companies over power lines or the like to the point of use, has an inherent inefficiency attributable to the way of the field and rotor are oriented, but this inefficiently has been tolerated because the power line electricity has heretofore been plentiful and economical. This conventional, "inherently inefficient" motor is now, however, being pressed into use as a prime mover for a battery-operated vehicle, and in this end use, the noted inefficiency significantly diminishes the operating range of the vehicle, requires a larger battery pack, more frequent recharging of the batteries, and has other serious shortcomings. Thus, the electric motor for a car or vehicle, as embodied in the design as heretofore described, which dispenses with the conventional orientation or relationship of stator and rotor for the solenoid-type relationship as described herein, represents a significant and noteworthy advance in this technology.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. In an electric motor of the type including plural stator coils each having a central opening and electrically connected to generate a magnetic field, and a magnetizable rotor adapted to be powered in rotation by said field, the improvements comprising a rotor formed of at least two plunger-like members journalled for rotation and disposed 180° apart, and at least two said stator coils, each of which is operatively arranged in cooperating relation with each said plunger member by being located in a slightly advanced position relative thereto, said coils being operatively arranged to be urged through rotation to thereby correspondingly urge said plunger members through rotation, whereby said generated magnetic field exerts a force on said rotor tending to pull it centrally through, rather than merely past, each said coil.

2. An improved electric motor of the type claimed in claim 1 wherein each said coil is mounted on a support member operatively arranged for rotation only in the contemplated rotational direction of said plunger members, whereby when each said coil is energized said plunger member cooperating therewith is urged through rotation toward said coil rather than vice versa.

3. An improved electric motor of the type claimed in claim 2 wherein each said coil is further mounted to rotate in unison with that plunger member with which it is not in cooperative relation, whereby the movement of one said plunger member advances the coil for the other said plunger member.

4. An improved electric motor of the type claimed in claim 3 wherein said plunger members are each journalled for rotation on a power take-off shaft and each includes an overriding clutch in the operation of which a driving relation to said shaft is established only during plunger member movement about said shaft toward said cooperating coil, and the slip direction of each said clutch coincides with said directional movement but of said shaft relative to said plunger members.

* * * * *